United States Patent Office 3,350,312
Patented Oct. 31, 1967

3,350,312
DIELECTRIC COMPOSITIONS CONTAINING HALOGENATED VOLTAGE STABILIZING ADDITIVES
Richard E. Gross, Framingham, and George H. Hunt, West Newton, Mass., assignors to Simplex Wire and Cable Company, Cambridge, Mass., a corporation of Massachusetts
No Drawing. Filed Mar. 2, 1966, Ser. No. 531,065
8 Claims. (Cl. 252—63.2)

ABSTRACT OF THE DISCLOSURE

Dielectric compositions are disclosed wherein a voltage stabilizing additive is incorporated into an ethylene or propylene base in a soluble amount between .2 and 2.5% by weight. The voltage stabilizing additives include 9,10-dibromoanthracene, 4 - bromobiphenyl, 4'4 - dibromobiphenyl, and 4-iodobiphenyl. The olefin base can be a low density polyethylene, a high density polyethylene or a polypropylene, e.g., isotactic polypropylene.

---

This is a continuation-in-part of application Ser. No. 403,942, filed Oct. 14, 1964, now abandoned which is in turn a continuation-in-part of application Ser. No. 132,-584, filed Aug. 21, 1961, now abandoned, which is in turn a continuation-in-part of application Ser. No. 1,877, filed Jan. 12, 1960, now abandoned.

This invention relates to polyethylene solid dielectrics and in particular provides a polyethylene based solid dielectric composition of improved voltage stability.

Polyethylene based solid dielectrics employed as cable insulation or the like, which do not contain some sort of voltage stabilizer, exhibit the disadvantageous property under applied alternating potential that when the applied potential is quickly raised to breakdown the breakdown voltage is substantially higher than when the applied potential is slowly raised and held for a period of time. Typically slow rise breakdown voltages for polyethylene insulation range between 65% and 85% of the quick rise breakdown voltage.

It is a principal object of this invention to provide voltage stability in polyethylene insulation in which the ratio of slow rise breakdown voltage to quick rise breakdown voltage is as high as 1.0 or more thereby increasing the service life of high voltage polyethylene insulation and reducing the amount of insulation required for a given voltage service. This and other objects of this invention are basically achieved by employing small amounts of certain voltage stabilizers which are effective when dispersed in polyethylene based solid dielectric compositions to raise the long time breakdown voltage of such compositions.

The particular voltage stabilizers used in the practice of the present invention are 4-bromobiphenyl, 4,4'-dibromobiphenyl, 9,10-dibromoanthracene, and 4-iodobiphenyl.

In particular, the additives of the invention have been found effective with low density polyethylene based compositions generally having a density on the order of .92 to about .95 and a melt index between 0.20 and 2.0. Specifically, the polyethylenes to which we refer are those solid polymers of ethylene prepared by the "high pressure" process, although the additives are also useful for the purpose in high density (low pressure) polyethylenes and in polypropylenes. The polyethylene compositions can, of course, contain minor amounts of the usual additives, adjuvents and fillers conventionally employed in polyethylene compositions, such as carbon black, pigments, anti-oxidants, heat stabilizers and ozone resistance stabilizers, and can also contain reactive components, such as cross-linking agents. The voltage stabilizers of our invention are also useful in increasing the voltage stability of polyethylene compositions over a long period of time where the polyethylene compositions contain minor amounts of rubbery polymers and copolymers of such olefins as isobutylene and isoprene.

The proportion of the voltage stabilizer compounds required for significant improvement in voltage stability of polyethylene are about 0.2 to 2.0 or 2.5% by weight based on the amount of polyethylene, and an important property of the compounds used in the practice of the present invention is their solubility in polyethylene which is at least 0.2% by weight in each case. Addition of voltage stabilizers in excess of their solubility in polyethylene causes their crystallization in the polyethylene with consequent weakening of the entire structure electrically by creating physical discontinuities, and is therefore to be avoided. We have found that addition of as much as 5% or more of the stabilizers may be harmful to the insulation and therefore should also be avoided.

It is also important that the compounds can be incorporated in the polyethylene without decomposition of the polyethylene or volatilization of the voltage stabilizer compound. Since temperatures on the order of 300 to 400° F. are required for successful blending of polyethylene with other materials, the voltage stabilizer additives should be liquid and should have a low vapor pressure at this temperature range. Accordingly, each of the stabilizers selected has a melting point below about 500° F. and a boiling point above about 300° F.

In order to illustrate the increased voltage stability achieved with the voltage stabilizers of our invention, a number of repeated tests were made to ascertain the long time voltage stability at different voltages with polyethylene solid dielectric compositions employing a polyethylene base A (0.92 specific gravity, 1.5 melt index and including a trace of a commercial thermal stabilizer). All samples were identical in size and shape and the manner of voltage application in each case was uniform. Three compositions were employed for testnig. The first series of samples tested were made of polyethylene A without any additives. The other two compositions employed contain polyethylene and 2.0% by weight of the polyethylene, in each composition respectively, of 4-bromobiphenyl and 9,10-dibromoanthracene. All of the samples containing additives were prepared by mixing on a hot mill at a temperature between 325° F. and 400° F. Each of the samples were subjected at room temperature to a uniform alternating current voltage and examined periodically for evidence of high voltage breakdown. The following Table I illustrates in terms of percentage of survival of samples the results of impressing 65 kv., 60 cycle AC on the samples of all the compositions.

TABLE I

| Exposure Time | Sample Compositions ||| 
|---|---|---|---|
| | Tested at 65 kv., 60 Cycles AC ||| 
| | Polyethylene A | Polyethylene A plus 2% of 4-bromobiphenyl | Polyethylene A plus 2% of 9,10-dibromo-anthracene |
| 5 Minutes | 0 | | |
| 1 Hour | 0 | 83 | 67 |

Another series of tests were made with compositions using a polyethylene base B (0.92 specific gravity, 1.5 melt index). All of the samples were identical in size and shape and the manner of voltage application in each case was the same. Five compositions were employed for testing. The first series of samples tested were made of polyethylene B without any additives. In this test the other four compositions employed contained polyethylene and 2% by weight of the polyethylene, in each composition respectively, of 4-bromobiphenyl, 4,4'-dibromobiphenyl, 9,10-dibromoanthracene and 4-iodobiphenyl. In this example the voltage was applied to all of the samples which were examined periodically until one-half of a particular series had failed. This was done at differing voltages and the voltage required to produce 50% failure in one hour (the critical voltage) was used as a measure of quality of the polyethylene formulation.

TABLE II

| Sample composition: | Kilovolts [1] |
|---|---|
| Polyethylene B | 19 |
| Polyethylene B plus 2% 4-bromobiphenyl | 70 |
| Polyethylene B plus 2%, 4,4'-dibromobiphenyl | 68 |
| Polyethylene B plus 2% 9,10-dibromoanthracene | 35 |
| Polyethylene B plus 2% 4-iodobiphenyl | 47 |

[1] Critical voltage at which groups of 8 to 10 samples were 50% failed during an hour exposure.

The above results were obtained at room temperature.

A third series of tests were made with compositions using a polyethylene C base (.947 specific gravity, 0.2 melt index). As in the previous tests, in each case the samples were identical and a series of samples of each composition were prepared as were also a series of samples of polyethylene C itslef. In this test two additional compositions were employed containing polyethylene and 2.0% by weight of the composition, in each composition respectively, of 4,4'-dibromobiphenyl and 9,10-dibromoanthracene. The tests in this example were made in the same manner as in Example 2 with the exception that a temperature of 150° F. was maintained during testing.

The following Table III illustrates the voltage required to produce 50% failure during an hour exposure.

TABLE III

| Sample composition: | Kilovolts |
|---|---|
| Polyethylene C | 13 |
| Polyethylene C plus 2% 4,4'-dibromobiphenyl | 26 |
| Polyethylene C, 9,10-dibromoanthracene | 23 |

Note.—For half failed in one hour.

The above results were obtained at 150° F.

A composite of various tests showing all of the stabilizing compositions of the present invention used with a polyethylene base having .92 specific gravity and 1.5 melt index, 2% of the stabilizing composition being present are listed for purposes of comparison in Table IV. As will be seen a blank sample without any stabilizing composition added is also listed. These results are presented as the ratio of the number of samples that failed to the total number tested, the duration of the test being shown below the ratio.

TABLE IV

| Test voltage, kv | 20 | 30 | 40 | 47 | 65 | 80 |
|---|---|---|---|---|---|---|
| Blank | 4/6 5 Min. | | | | | |
| 4-bromobiphenyl | | | | | 4/8 1 hr. | |
| 4-iodobiphenyl | | | | 4/8 1 hr. | | |
| 4,4'-dibromobiphenyl | | | | | | 4/8 1 hr. |
| 9,10-dibromoanthracene | | 4/8 1 hr. | | | | |

The following are further examples of solid dielectric compositions in accordance with the present invention which exhibit high voltage stability:

Example 1

Base: high density polyethylene, M.P.—240–260° F., density .94, prepared by polymerization of ethylene in the presence of a chromia-silica-alumina catalyst at a temperature of 150–450° F. and a pressure of 0 to 700 p.s.i.g.

Additive: 9,10-dibromoanthracene, 1.5% by weight based on polyethylene.

Example 2

Base: isotactic polypropylene, M.P.—310° F., prepared by polymerization of propylene in the presence of titanium tetrachloride and triethyl aluminum at 140° F. and a pressure of 30–150 p.s.i.g.

Additive: 4,4'-dibromobiphenyl, 0.5% by weight based on polypropylene.

Example 3

Base: low density polyethylene, density .92, melt index 1.5, prepared by the so-called "high pressure" process and similar in all respects to polyetheylene A.

Additive: 4-bromobiphenyl, 2.5% by weight based on polypropylene.

We claim:
1. A solid dielectric composition consisting essentially of a polyethylene base having disposed therein a soluble amount between .2 and 2.5% by weight based on the polyethylene of a voltage stabilizer selected from the group consisting of 9,10-dibromoanthracene, 4-bromobiphenyl, 4,4'-dibromobiphenyl and 4-iodobiphenyl.

2. The composition of claim 1 in which the voltage stabilizer is 9,10-dibromoanthracene.

3. The composition of claim in 1 in which the voltage stabilizer is 4-bromobiphenyl.

4. The composition of claim 1 in which the voltage stabilizer is 4,4'-dibromobiphenyl.

5. The composition of claim 1 in which the voltage stabilizer is 4-iodobiphenyl.

6. The composition of claim 1 in which the voltage stabilizer is present in the amount of 2% by weight.

7. A solid dielectric composition consisting essentially of a solid polymer of an olefin selected from the group consisting of ethylene and propylene, said polymer having disposed therein a soluble amount between 0.2 and 2.5% by weight based on the polymer of a voltage stabilizer selected from the group consisting of 9,10-dibromoanthracene, 4-bromobiphenyl, 4,4'-dibromobiphenyl and 4-iodobiphenyl.

8. The composition of claim 1 in which the polyethylene base is low density polyethylene.

References Cited

UNITED STATES PATENTS 3,075,040   1/1963   Lemmerich et al.

LEON D. ROSDOL, *Primary Examiner.*

J. D. WELSH, *Assistant Examiner.*